Oct. 11, 1932.  C. W. KANOLT  1,882,647
ILLUMINATED DISPLAY CASE
Filed April 18, 1930   2 Sheets-Sheet 1
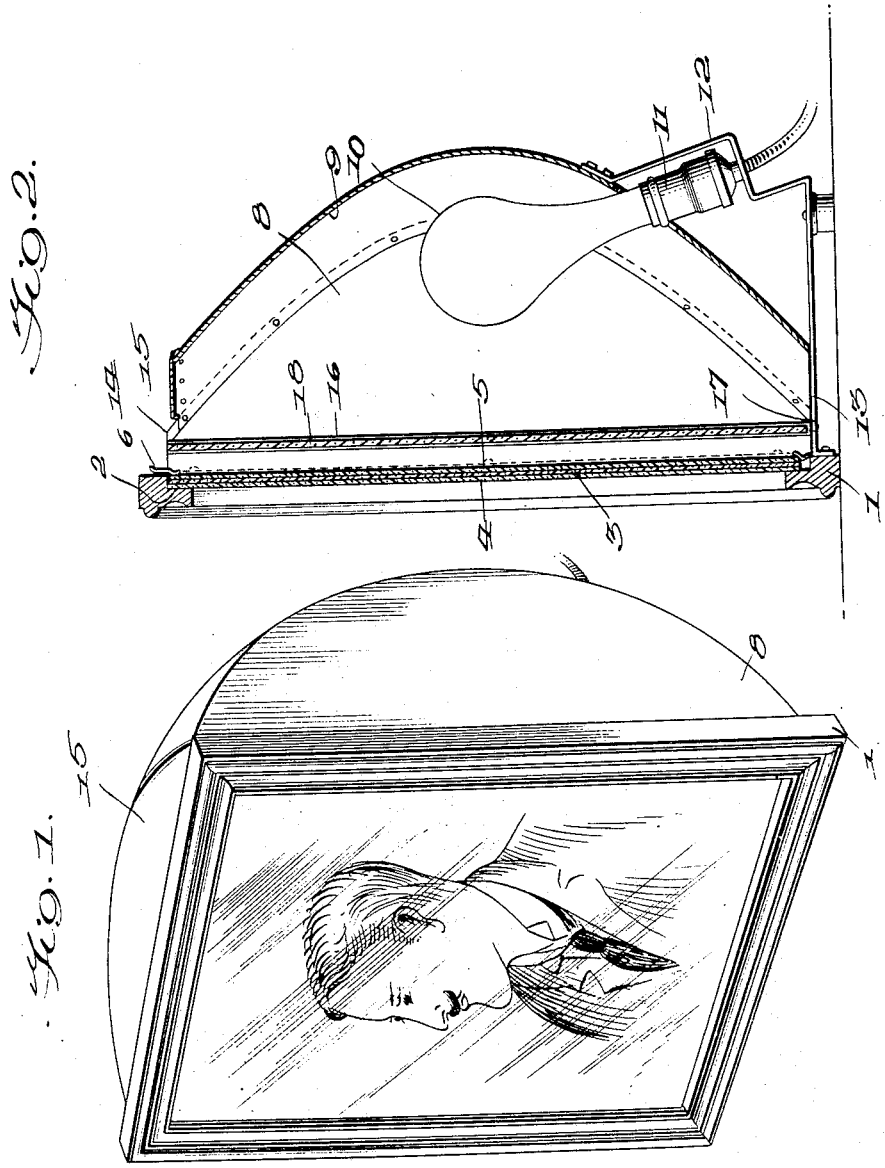

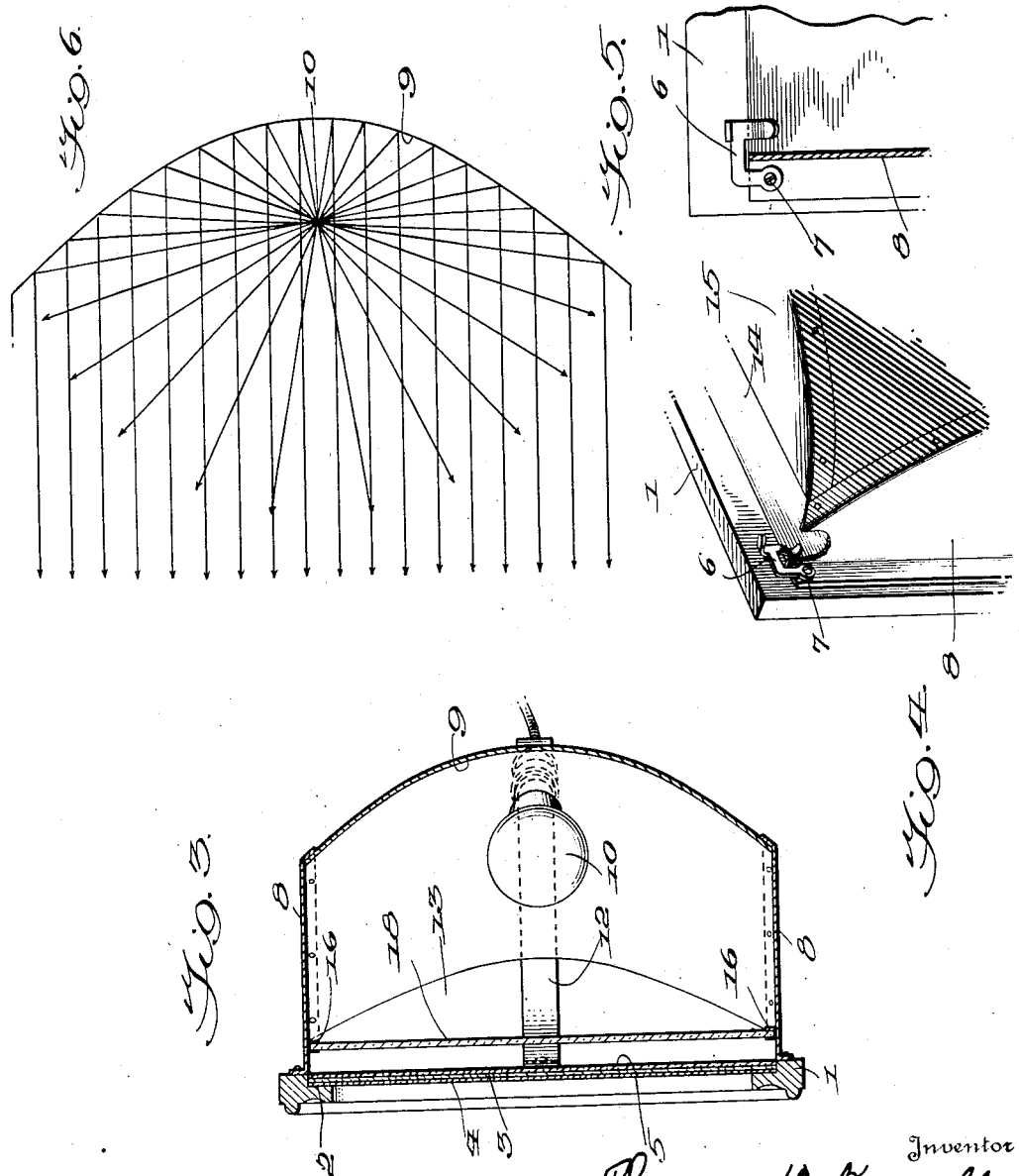

Patented Oct. 11, 1932

1,882,647

UNITED STATES PATENT OFFICE

CLARENCE W. KANOLT, OF NEW YORK, N. Y.

ILLUMINATED DISPLAY CASE

Application filed April 18, 1930. Serial No. 445,437.

This invention relates to the exhibition of illuminated transparencies such as transparent stereoscopic pictures.

When such transparencies are displayed in show-windows, it is usually difficult to illuminate them so brightly that they will be clearly displayed when exposed to strong daylight. If an electric lamp of sufficient wattage to give the required illumination is employed, it usually produces so much heat as to crack or damage the transparency or the glass with which it is connected.

The illuminated display case embodying the present invention utilizes the light from the lamp or lamps therein so efficiently and effectively that sufficient illumination can be obtained without the use of excessive wattage. The device comprises essentially a display case containing a source of illumination, such as one or more lamps, and a reflector having the form of a conic section in transverse section so designed as to reflect the greater part of the light that falls upon it forward through the transparency.

In the new form of display case, a sheet of ground glass or similar light diffusing material is placed between the transparency and the lamp and separated from both. Ventilation is provided between the transparency and the ground glass and also between the ground glass and the lamp. This arrangement of the ground glass or light diffusing material is an added protection of the transparency from the heat of the lamp. The ventilation on both sides of the ground glass allows the use of a lamp of a greater wattage than could be employed if the ground glass was placed directly or substantially in contact with the transparency.

Another advantage of the arrangement is that the ground glass improves the diffusion of the light, rendering the light that comes directly from the lamp without reflection, and any other unequal distribution of light, less noticeable than it would be without efficient light-diffusing means, or not observable at all.

In the acompanying drawings:

Fig. 1 is a perspective view of the complete display case;

Fig. 2 is a vertical sectional view therethrough;

Fig. 3 is a horizontal sectional view through the case;

Fig. 4 is a detail perspective view showing the clip for holding the transparency in place;

Fig. 5 is a detail transverse sectional view of the same; and

Fig. 6 is a diagrammatic view showing the manner in which the light is reflected.

In the display case, there is the usual frame 1 having a groove 2 provided in the back thereof for receiving a transparency 3 carrying the picture or other matter to be displayed. A sheet of protecting glass 4 may be placed over the front of the transparency and a sheet of ground glass 5 or other light diffusing material or screen placed over the back, so as to protect the transparency on both sides. These sheets are usually constructed as a unit for assembly within the frame 1. They may be held in place by suitable clips 6 pivoted as at 7 to the back of the frame 1, as shown in Figs. 4 and 5.

Disposed behind the frame 1 and secured thereto is a casing having sides 8, to the back edge of which is attached a reflector 9 curved approximately as shown in Figs. 2, 3 and 6 and of the general shape of a conic section or the like in transverse section. This form of reflector serves to concentrate the rays of light on the transparency to such an extent that the wattage of the lamp or lamps may be substantially reduced while yet providing a full illumination sufficiently strong to properly display the transparency.

The lamp is designated by the numeral 10 and extends downward through the reflector 9, being secured in the usual socket 11, which socket is supported by a stand 12 formed of a metallic strip, one end of which is attached to the back of the reflector 9 while the other end extends forwardly and is secured to the back of the frame 1. The space behind the transparency 3 and between the frame 1 and the lower edge of the reflector 9 is open as at 13, with a similar opening 14 at the top, which latter opening is reduced in area by a metallic sheet 15 which prevents too much of the light of the lamp from escaping through the opening 14 in the top of the case with the possibility of annoying an observer.

Secured to the sides 8 on the inner sides thereof are channels 16 open at the top but having inturned flanges 17 forming stops at the bottom. A sheet of ground glass 18 or other light diffusing material is slidably received within the channels 16 and is spaced a substantial distance behind the transparency 3 and in front of the lamp 10. It is also within the confines of the ventilating openings 13 and 14, as clearly shown in Fig. 2, so that ventilation will be provided over both sides of the light diffusing screen 18, between the transparency and the ground glass and also between the ground glass and the lamp. This disposition of the ground glass serves as an increased protection for the transparency from the heat of the lamp.

With this arrangement, a lamp of a higher wattage may be used without damaging either the transparency or the light diffusing screen, because of the ventilation on both sides of the latter, while without the arrangement of the ground glass a lamp of the same wattage would cause injury to the transparency.

This, in cooperation with the shape of the reflector and the disposition of the lamp approximately at the focus or focal line of the reflector, allows the use of a lamp of a maximum wattage without causing injury to the transparency. Another advantage is that the arrangement improves the diffusion of the light, rendering the light that comes directly from the lamp without reflection and any other unequal distribution of light less noticeable than it would be without effective light diffusing means, or not observable at all.

With this arrangement, both the space between the transparency and the light diffusing screen 18 and the space back of the diffusing screen and between the latter and the lamp are separately ventilated by an opening in the bottom of the case, by which cool air from outside the case may enter, and by an opening in the top, by which warm air may leave the case.

Only the one light diffusing screen 18 may be used if desired and the screen 5 omitted. Also, if desired, other sheets or forms of reflectors may be used than that illustrated and other changes may be made in the device without departing from this invention. A diffusing reflector may be used instead of a specular one, if desired.

I claim:

1. A display case for transparencies or the like comprising means for supporting said transparencies, a light diffusing screen spaced a substantial distance behind the transparencies, a reflector curved to provide a light focus, illuminating means spaced a substantial distance behind the screen and approximately at the focus of the reflector, and means for ventilating the spaces between the transparencies and screen, and the illuminating means and screen.

2. A display case for transparencies or the like comprising a frame for supporting a transparency, a casing behind the frame, a support for holding the casing elevated above the surface on which the support rests, a reflector, illuminating means for the transparency and carried by the casing, channels carried on opposite sides of the casing for supporting a light diffusing screen in spaced relation a substantial distance from the transparency and illuminating means, said casing having enlarged openings in the top and bottom thereof for ventilating the spaces between the screen and transparency, and between the screen and illuminating means.

3. A display case for transparencies or the like comprising means for supporting said transparencies, a light diffusing screen spaced behind the transparencies, a parabolic reflector, illuminating means arranged behind the diffusing screen, and approximately at the focus of the reflector, and means for ventilating the spaces between the transparency and screen, and the illuminating means and screen.

4. A display case for transparencies or the like comprising means for supporting a transparency, means for supporting a light diffusing screen spaced behind the transparency, a casing having openings in different sides thereof, each of said openings extending beyond the opposite edges of the screen to effect ventilation of the spaces on both sides of the screen, and illuminating means for the transparency disposed behind the screen.

5. A display case for transparencies or the like comprising means for supporting a transparency, a casing having ventilating openings in opposite sides thereof, channels carried on opposite sides of the casing for supporting a light diffusing screen spaced behind the transparency, each of the openings extending beyond the opposite side edges of the screen to effect ventilation of the space on both sides of the screen, and illuminating means for the transparency disposed behind the screen.

6. A display case for transparencies or the like comprising means for supporting a transparency, means for supporting a screen spaced behind the transparency, a reflector, illuminating means spaced behind the screen, and means for ventilating the spaces between the transparency and the screen and the illuminating means and the screen.

7. A display case for transparencies or the like comprising means for supporting a transparency, means for supporting a screen spaced behind the transparency, a reflector curved to provide a light focus, illuminating means spaced behind the screen and approximately at the focus of the reflector, and means for ventilating the spaces between the transparency and the screen and the illuminating means and the screen.

8. In a display case, a frame having a groove for receiving a transparency, and one or more spring clips, each pivoted to the frame behind the transparency and having an arm extending laterally at an angle from the main portion thereof to over-lap, engage and hold the transparency in position in the groove.

9. In a display case, a frame having a groove for receiving a transparency, and one or more clips having the main portion pivoted to the frame and having a spring arm extending at an angle from the main portion thereof to engage and hold the transparency in position in the frame.

10. In a display case, a frame having grooves in opposite sides thereof for receiving the side edges of a transparency, and a spring clip having the main portion pivotally supported by the frame adjacent each of the grooves and having a portion thereof in position to engage an edge of the transparency to hold the same in place in the frame.

11. A display case for transparencies comprising a frame for supporting a transparency, a reflector disposed behind the transparency and having side walls connected with the frame, grooves on the inner sides of the walls having stops at the bottom thereof, a light diffusing screen received in the grooves, the reflector having the top and bottom thereof opening on both sides of the light diffusing screen to allow a circulation of air therethrough, and illuminating means within the reflector.

12. In a display case, a frame for receiving a transparency, a casing attached to the frame and adapted to be disposed at a side of the transparency, and one or more clips having a main portion pivoted to the frame outside the casing and having an arm extending over an edge of the casing for holding the transparency in place.

13. In a display case, a frame for receiving a transparency, a casing attached to the frame and adapted to be disposed on the outer side of the transparency, and a clip having a main portion pivoted to the frame on the outside of the casing and having a spring arm extending at an angle from said main portion and extending over an edge of the casing for holding the transparency in place.

In testimony whereof I affix my signature.

CLARENCE W. KANOLT.